United States Patent
Chin et al.

(10) Patent No.: US 7,535,999 B2
(45) Date of Patent: May 19, 2009

(54) VOICE MAIL BRIDGING IN COMMUNICATION SYSTEMS

(75) Inventors: Frances Mu-Fen Chin, Naperville, IL (US); Peggy H. Hasan, Aurora, IL (US); Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 636 days.

(21) Appl. No.: 11/131,755

(22) Filed: May 18, 2005

(65) Prior Publication Data

US 2006/0262911 A1 Nov. 23, 2006

(51) Int. Cl.
*H04M 1/64* (2006.01)
(52) U.S. Cl. .............................. 379/88.25; 379/211.02; 379/220.01
(58) Field of Classification Search .............. 379/88.18, 379/88.25, 211.02; 455/413
See application file for complete search history.

(56) References Cited

U.S. PATENT DOCUMENTS

| | | | |
|---|---|---|---|
| 5,206,901 A * | 4/1993 | Harlow et al. .......... | 379/211.04 |
| 6,418,306 B1 * | 7/2002 | McConnell ................. | 455/413 |
| 7,006,818 B1 * | 2/2006 | Yu .............................. | 455/413 |
| 7,136,461 B1 * | 11/2006 | Swingle et al. ........... | 379/88.13 |
| 7,194,080 B2 * | 3/2007 | Worsham et al. ....... | 379/211.03 |
| 7,305,069 B1 * | 12/2007 | Day ........................ | 379/88.13 |
| 2002/0129174 A1 * | 9/2002 | LaBaw ....................... | 709/310 |

* cited by examiner

*Primary Examiner*—Simon Sing

(57) ABSTRACT

Communication systems and methods are disclosed that provide a voice mail bridging service. A communication network attempts to connect a call between a calling party and a called party. The called party has a plurality of telephone numbers corresponding with a plurality of voice mail systems. Responsive to the communication network determining that the called party has not answered the call attempt, the communication network prompts the calling party to record a voice message. The communication network receives a voice message from the calling party. The communication network identifies a plurality of telephone numbers for the called party, such as a home number, a mobile number, a business number, etc. The communication network then transmits the voice message to the voice mail systems corresponding with the identified telephone numbers for the called party. The called party can thus access any of the voice mail systems to retrieve the voice message.

15 Claims, 6 Drawing Sheets

VOICE MAIL BRIDGING IN COMMUNICATION SYSTEMS

BACKGROUND OF THE INVENTION

1. Field of the Invention

The invention is related to the field of communication systems and, in particular, to communication systems and methods for bridging voice mail among a plurality of voice mail systems.

2. Statement of the Problem

Telephone service providers offer many features to service subscribers. One feature traditionally offered is voice mail services. Wireline service providers, wireless service providers, VoIP service providers, etc, all offer some type of voice mail service. For example, if a caller places a call to a wireless subscriber and the wireless subscriber does not answer the call, then the wireless network routes the call to a voice mail system for the wireless subscriber. The caller may then leave a voice message in the voice mailbox for the wireless subscriber.

One problem with current voice mail services is that a person may have many telephone numbers, and consequently, many voice mailboxes. For instance, a person may have a home number, a mobile number, and a business number. The person probably also has a voice mailbox corresponding with each of those telephone numbers. If a caller wishes to leave a voice message for that person, then a problem for the caller is whether to leave a voice message at the home number, at the mobile number, or at the business number. The caller probably does not know which voice mailbox the person will check first. Therefore, to be sure the person gets the voice message in a timely manner, the caller may have to call each telephone number for that person and leave a voice message at each number. This is inefficient and an inconvenience for the caller.

SUMMARY OF THE SOLUTION

The invention solves the above and other related problems with a communication system and associated methods that allow a caller to leave a single voice message in a communication network that is transmitted to more than one voice mail system for the called party. Such a service is referred to herein as a voice mail bridging service. Using the voice mail bridging service, the caller does not have to guess which voice mailbox the called party will check first. Also, the caller does not have to leave a separate voice message in each voice mailbox of the called party. The communication network advantageously bridges the voice mailboxes of the called party so that the caller need only leave a single message. The invention also works for voice mail systems of different service providers.

In one embodiment of the invention, a communication system of the invention includes a communication network and a plurality of voice mail systems. The communication network is connected to a calling party and a called party. The called party has a plurality of telephone numbers, where each of the telephone numbers corresponds with one of the voice mail systems. For example, the called party may have a home number, a mobile number, a business number, etc.

When in operation, the calling party places a call to one of the telephone numbers of the called party. The communication network receives dialing information from the calling party for the call and attempts to connect the call to the called party. If the called party does not answer the call, then the communication network determines that the called party has not answered the call attempt. Responsive to this determination, the communication network prompts the calling party to record a voice message. The communication network receives a voice message from the calling party. The communication network identifies a plurality of telephone numbers for the called party, such as the home number, the mobile number, the business number, etc. The communication network then transmits the same voice message to the voice mail systems corresponding with the identified telephone numbers for the called party. The called party can thus access any of the voice mail systems to retrieve the voice message.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
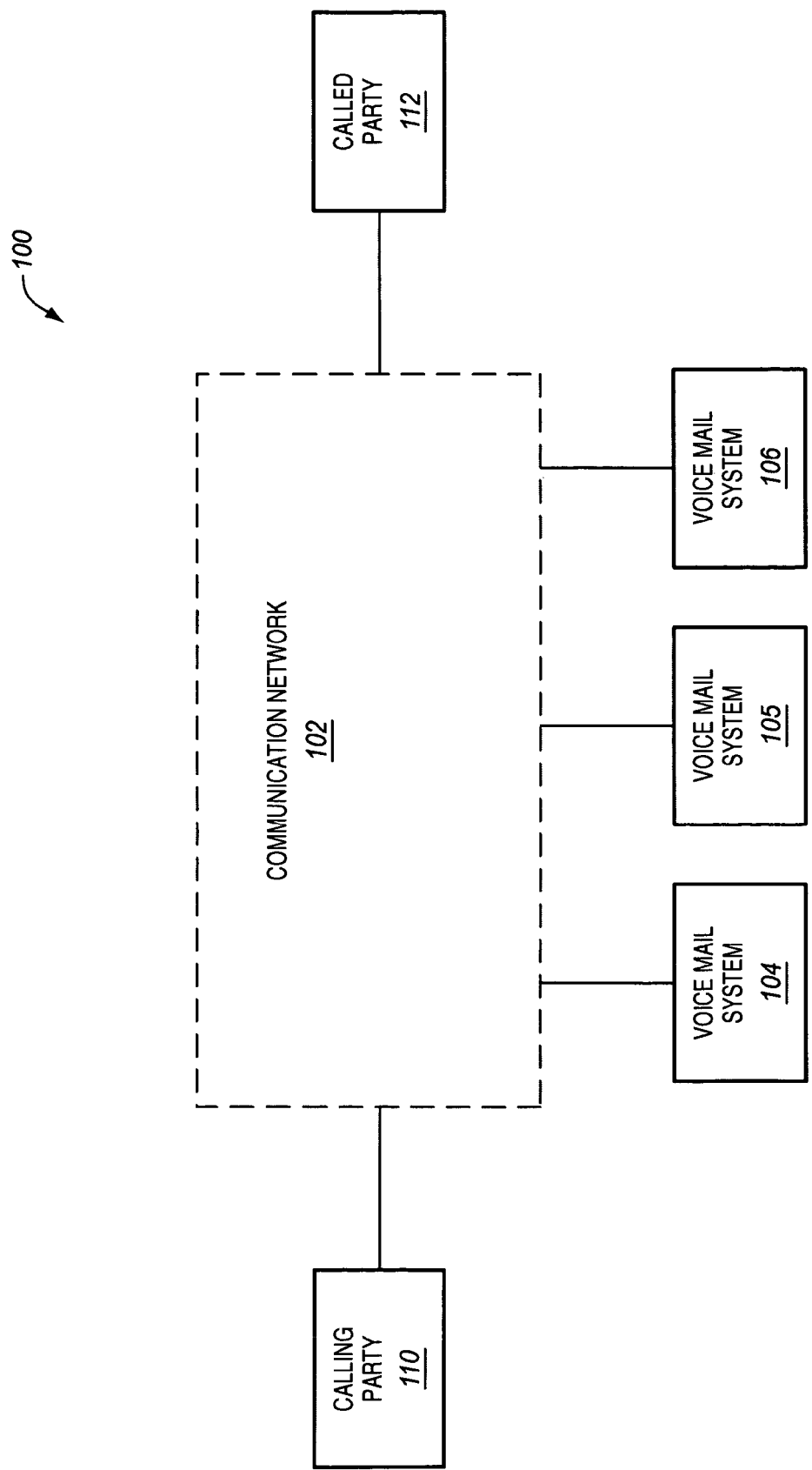
FIG. 1 illustrates a communication system in an exemplary embodiment of the invention.

FIG. 1 illustrates a communication system 100 in an exemplary embodiment of the invention. Communication system 100 includes a communication network 102 and a plurality of voice mail systems 104-106. Communication network 102 comprises any network such as a wireline network, a wireless network, a circuit-based network, a packet-based network, or any other network or combination thereof. Voice mail systems 104-106 comprise any systems, devices, or servers that record, store, and retrieve voice messages. Although three voice mail systems 104-106 are shown in FIG. 1, communication system 100 may include other voice mail systems. Communication system 100 may include other networks, systems, or devices not shown for the sake of brevity.

Voice mail systems 104-106 may be part of communication network 102, but are shown separately for illustrative purposes. Voice mail systems 104-106 may be separate voice mail systems, such as for different service providers. For instance, voice mail system 104 may be for Qwest, while voice mail system 105 is for Verizon, while voice mail system 106 is for a private business.

Alternatively, voice mail systems 104-106 may also be part of a larger system (not shown) controlled by a single service provider, and do not have to be separate physical systems. For instance, voice mail system 104 and voice mail system 105 may be separate voice mailboxes in a larger system of a service provider.

Regardless of the configuration of voice mail systems 104-106, each voice mailbox within a voice mail system 104-106 corresponds with a different telephone number.

Communication network 102 is operable to connect a call between a calling party 110 and a called party 112. Called party 112 has a plurality of telephone numbers, such as a home number, a mobile number, a business number, etc. There is a voice mail system 104-106 corresponding with each telephone number for called party 112. To correspond with a telephone number means that a voice mail system 104-106 includes a voice mailbox for that telephone number. Called party 112 can thus access the voice mailbox to retrieve any voice messages. In this embodiment, voice mail system 104 may be for a home number of called party 112. Voice mail system 105 may be for a mobile number of called party 112. Voice mail system 106 may be for a business number of called party 112.

When in operation, calling party 110 dials one of the telephone numbers for called party 112 to attempt to connect a call to called party 112. Communication network 102 receives the dialing information from calling party 110 and attempts to connect the call to called party 112.

Figure 2:
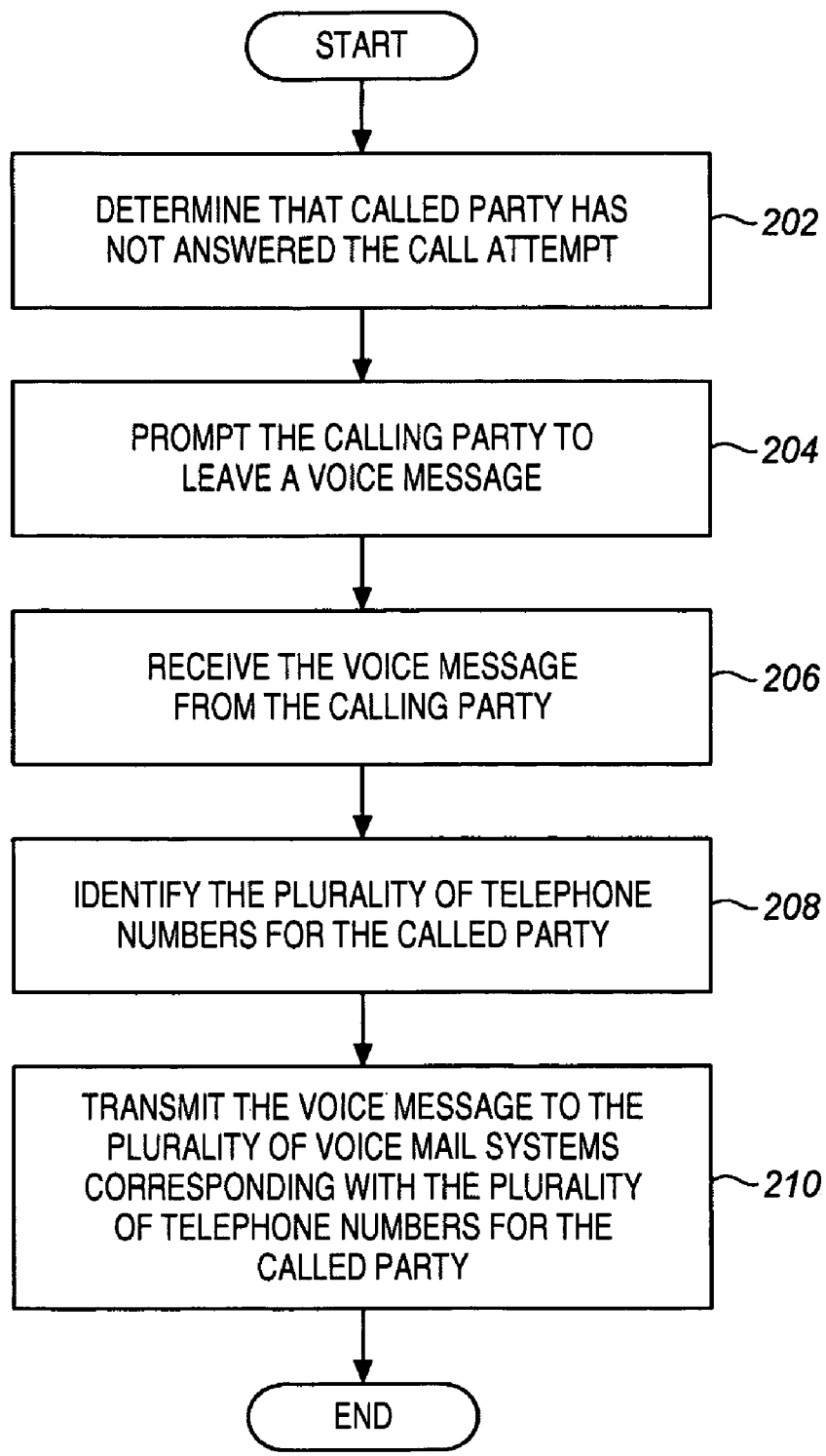
FIG. 2 is a flow chart illustrating a method of operating the communication system of FIG. 1 in an exemplary embodiment of the invention.

FIG. 2 is a flow chart illustrating a method 200 of operating communication system 100 to provide a voice mail bridging service in an exemplary embodiment of the invention. The steps of the flow chart in FIG. 2 are not all inclusive and may include other steps not shown.

In step 202, communication network 102 determines that called party 112 has not answered the call attempt. Communication network 102 may determine that called party 112 has not answered in a conventional manner. For instance, a terminating node (not shown) in communication network 102, such as a terminating Mobile Switching Center (MSC) or a terminating switch, may determine if called party 112 has not answered the call attempt.

In step 204, communication network 102 prompts calling party 110 to record a voice message responsive to determining that called party 112 has not answered the call attempt. Communication network 102 may prompt calling party 110 with an announcement or some other information inquiring whether calling party 110 wants to record a voice message. For instance, communication network 102 may prompt calling party 110 with a message such as: "If you would like to leave a message, please begin speaking at the tone". In step 206, communication network 102 receives a voice message from calling party 110.

In step 208, communication network 102 identifies a plurality of telephone numbers for called party 112. Communication network 102 may identify one of the telephone numbers for called party 112 based on the dialed number for the current call. Communication network 102 may identify additional telephone numbers for called party 112 by accessing a database of pre-recorded numbers for called party 112, by prompting the calling party 110 for the additional numbers for called party 112, or identify the additional numbers in any other manner. As an example, if the telephone number for the current call is a home number for called party 112, then the additional telephone numbers for called party 112 may be a mobile number, a business number, etc. In step 208, communication network 102 does not necessarily identify each and every number of called party 112. Communication network 102 may identify a subset of all of the numbers of called party 112.

In step 210, communication network 102 then transmits the same voice message to voice mail systems 104-106 for the identified telephone numbers for called party 112. Once again, communication network 102 does not necessarily transmit the voice message to each and every number of called party 112. Communication network 102 may transmit the voice message to a subset of all of the numbers of called party 112.

Each of the voice mail systems 104-106 receives and stores the voice message in a voice mailbox for called party 112. Voice mail systems 104-106 may also transmit an indicator of a new voice message to the communication device of called party 112. For instance, if the communication device of the called party 112 is a mobile phone, then the voice mail system 104-106 may transmit an indicator to the mobile phone that causes the mobile phone to display an envelope. If the communication device of the called party 112 is a business phone, then the voice mail system 104-106 may transmit an indicator to the business phone that causes the business phone to illuminate a light on the phone.

One of called party 112 or calling party 110 may need to subscribe to the voice mail bridging service. For instance, if called party 112 is a subscriber to the voice mail bridging service, then called party 112 would pre-record or pre-register a plurality of telephone numbers associated with called party 112. For instance, the telephone numbers may be a home number, a mobile number, a business number, etc. Called party 112 pre-records the telephone numbers with communication network 102 or with the service provider utilizing communication network 102. Communication network 102 then stores the telephone numbers for called party 112, such as in a subscriber database for the called party 112. Communication network 102 may store the telephone numbers in a Home Location Register (HLR) for called party 112 if communication network 102 is a wireless network, or may store the telephone numbers in a Service Control Point (SCP) if communication network 102 is a wireline network.

When communication network 102 determines that called party 112 has not answered the call, communication network 102 can already identify the current telephone number of the call as dialed by calling party 110 due to conventional signaling. Thus, communication network 102 transmits the voice message to the voice mail system 104-106 for the current telephone number of the call. To identify the additional telephone numbers of called party 112, communication network 102 retrieves the stored telephone numbers, such as from a subscriber database, and identifies the additional telephone numbers of called party 112. Communication network 102 then transmits the same voice message to the voice mail systems 104-106 for the additional telephone numbers.

If called party 112 is not a subscriber to the voice mail bridging service, then calling party 110 may still access the voice mail bridging service if the calling party 110 is a subscriber. When calling party 110 records a voice message for called party 112, calling party 110 may also enter one or more additional telephone numbers for called party 112. For instance, when communication network 102 determines that called party 112 has not answered the call, communication network 102 prompts calling party 110 to record a voice message. Calling party 110 may record the voice message and enter one or more telephone numbers for called party 112 for which calling party 110 wants to leave the voice message. Communication network 102 can already identify the current telephone number of the call as dialed by calling party 110 due to conventional signaling. Thus, communication network 102 transmits the voice message to the voice mail system 104-106 for the current telephone number of the call. To identify the additional telephone numbers of called party 112, communication network 102 receives these additional telephone numbers from calling party 110. Communication network 102 then transmits the same voice message to the voice mail systems 104-106 for the additional telephone numbers.

Figure 3:
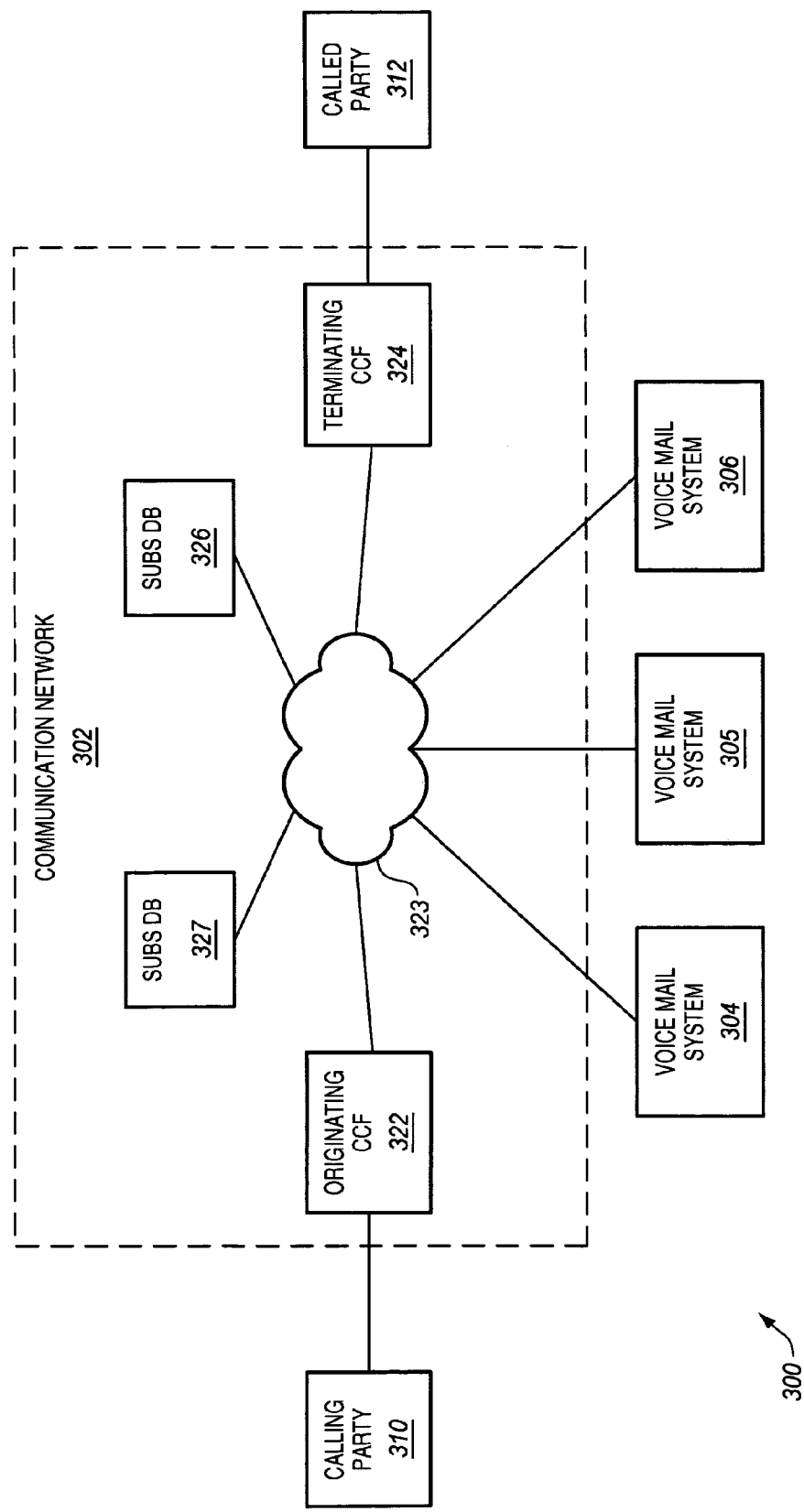
FIG. 3 illustrates a communication system in another exemplary embodiment of the invention.

FIG. 3 illustrates a communication system 300 in another exemplary embodiment of the invention. Communication system 300 includes a communication network 302 and a plurality of voice mail systems 304-306. Communication network 302 comprises any network such as a wireline network, a wireless network, a circuit-based network, a packet-based network, or any other network or combination thereof. Although three voice mail systems 304-306 are shown in FIG. 3, communication system 300 may include other voice mail systems. Voice mail systems 304-306 may be part of communication network 302, but are shown separately for illustrative purposes. Communication system 300 may include other networks, systems, or devices not shown for the sake of brevity.

Communication network 302 is operable to connect a call between a calling party 310 and a called party 312. Communication network 302 comprises an originating call control function (CCF) 322, a network cloud 323, a terminating CCF 324, and subscriber databases 326-327. Originating CCF 322 comprises any network function that serves a calling party. Originating CCF 322 may comprise a call control function in an originating MSC or an originating switch. Terminating CCF 324 comprises any network function that serves a called party. Terminating CCF 324 may comprise a call control function in a terminating MSC or a terminating switch. Subscriber databases 326-327 comprise any databases or servers that store information regarding a subscriber to a service or a feature in a communication network. Subscriber database 326 may comprise an HLR in a wireless network or an SCP in a wireline network for called party 312. Similarly, subscriber database 327 may comprise an HLR in a wireless network or an SCP in a wireline network for calling party 310. Network cloud 323 illustrates that originating CCF 322 and terminating CCF 324 may be connected by any type of network.

Figure 4:
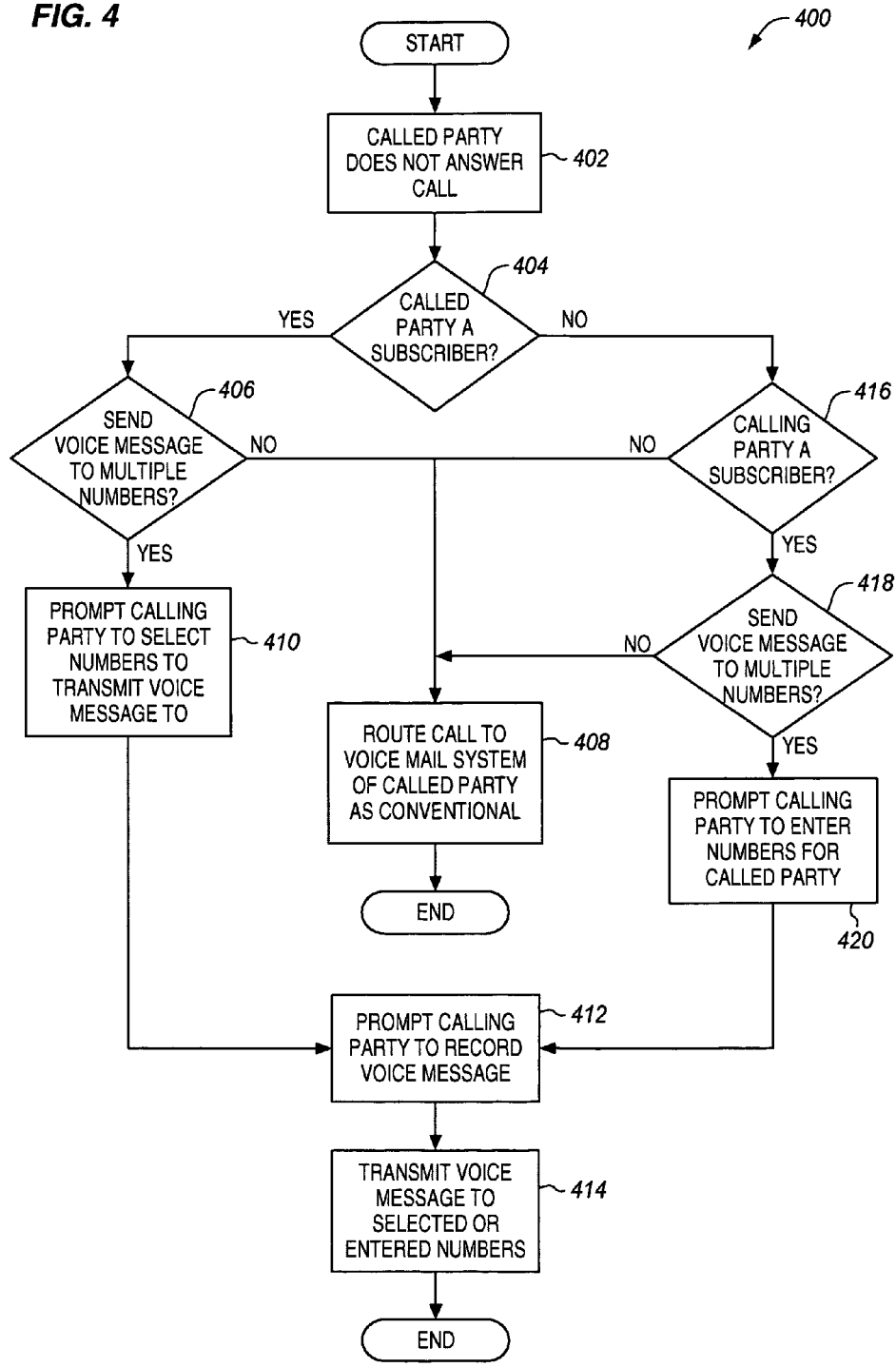
FIG. 4 is a flow chart illustrating an exemplary operation of the communication system in FIG. 3.

FIG. 4 is a flow chart illustrating an operation of communication system 300 in an exemplary embodiment of the invention. The operation described in FIG. 4 is a general operation of communication system 300, and a more detailed operation is discussed in relation to FIGS. 5-6.

When in operation, calling party 310 places a call to called party 312 (see FIG. 3). In step 402, called party 312 does not answer. A determination is then made whether called party 312 is a subscriber to the voice mail bridging service in step 404. If called party 312 is a subscriber to the voice mail bridging service, then a query is made in step 406 to the calling party 310 whether calling party 310 wants to send a voice message to multiple telephone numbers for called party 312. If calling party 310 does not want to send a voice message to multiple telephone numbers for called party 312, then the call is routed to the voice mail system for the number of the current call as is conventionally done in step 408. If calling party 310 does want to send a voice message to multiple telephone numbers for called party 312, then calling party 310 is prompted to select one or more pre-defined telephone numbers for called party 312 in step 410. Calling party 310 is then prompted to record a voice message in step 412. The voice message is then transmitted to the selected telephone numbers for called party 312 in step 414.

Referring back to step 404, if called party 312 is not a subscriber to the voice mail bridging service, then a determination is made whether calling party 310 is a subscriber to the voice mail bridging service in step 416. If calling party 310 is not a subscriber to the voice mail bridging service, then the call is routed to the voice mail system for the number of the current call as is conventionally done in step 408. If calling party 310 is a subscriber to the voice mail bridging service, then a query is made in step 418 whether calling party 310 wants to send a voice message to multiple telephone numbers for called party 312. If calling party 310 does not want to send a voice message to multiple telephone numbers for called party 312, then the call is routed to the voice mail system for the number of the current call as is conventionally done in step 408. If calling party 310 does want to send a voice message to multiple telephone numbers for called party 312, then calling party 310 is prompted to enter one or more additional telephone numbers for called party 312 in step 420. Calling party 310 is then prompted to record a voice message in step 412. The voice message is then transmitted to the entered telephone numbers for called party 312 in step 414.

Figure 5:
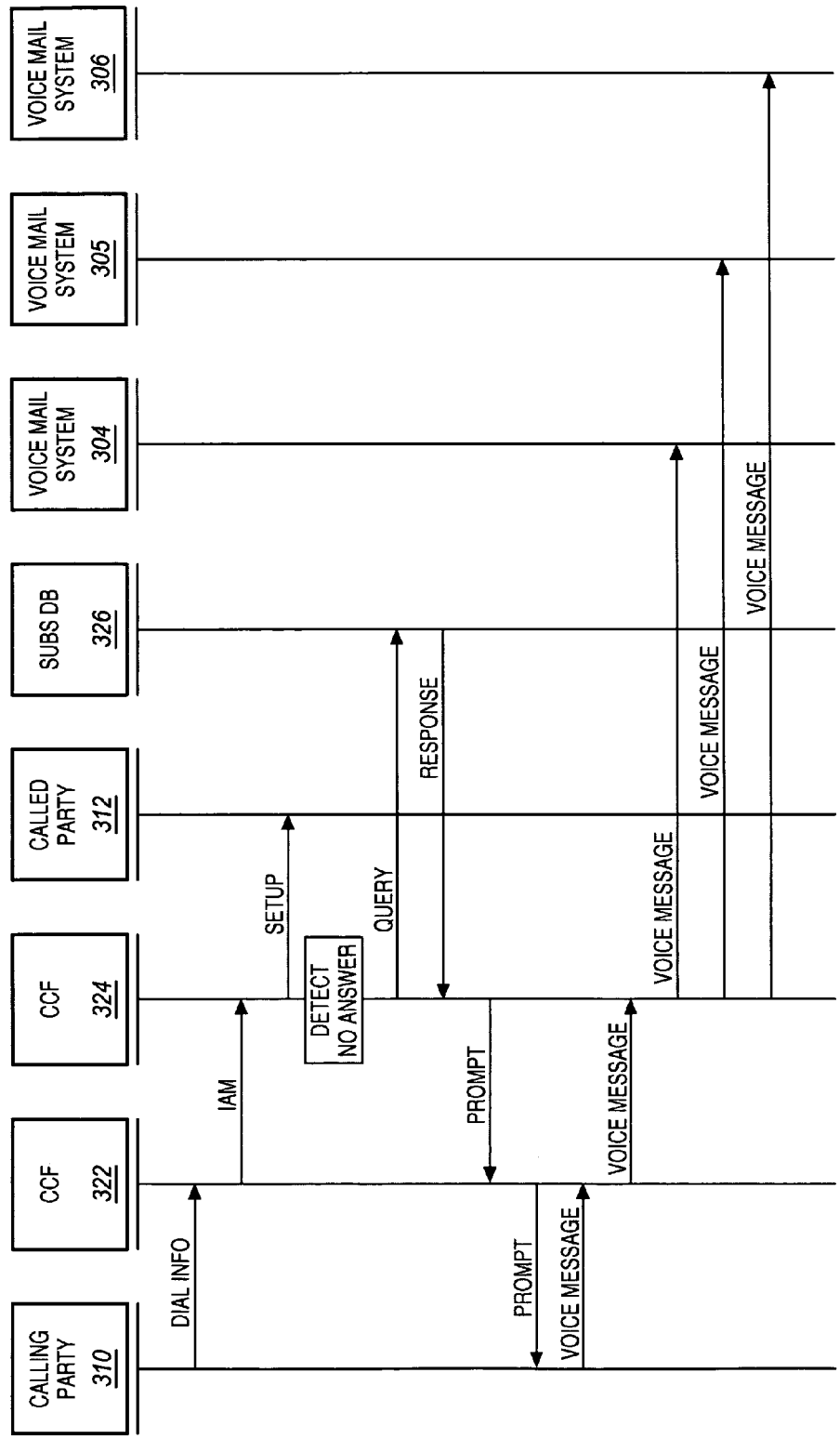
FIG. 5 is a signaling diagram illustrating a more detailed operation of the communication system in FIG. 3.

FIG. 5 is a signaling diagram illustrating a more detailed operation of the communication system 300 in FIG. 3. For the embodiment described in FIG. 5, called party 312 is a subscriber to the voice mail bridging service. Therefore, called party 312 pre-records a plurality of telephone numbers, associated with called party 312, with communication network 302 or the service provider utilizing communication network 302. Communication network 302 stores the plurality of telephone numbers for called party 312 in the subscriber database 326. The subscriber database 326 is accessible by terminating CCF 324. Assume for this embodiment that called party 312 stores a telephone number for a mobile phone, a home phone, and a business phone. Also assume that called party 312 has a separate voice mailbox for each of these numbers. The different voice mailboxes are provided by voice mail systems 304-306, respectively.

When in operation, calling party 310 dials the mobile number of called party 312 to attempt to connect a call to called party 312. Originating CCF 322 receives the dialing information from calling party 310 and transmits an Initial Address Message (IAM) to terminating CCF 324. Terminating CCF 324 receives the IAM and transmits a setup message to called party 312 to ring a mobile phone of called party 312. Assume for this embodiment that called party 312 does not answer the call (e.g., no answer or busy). Terminating CCF 324 detects the no answer by the called party 312, such as after a particular number of rings. Responsive to detecting the no answer, terminating CCF 324 transmits a query to subscriber database 326 to determine if called party 312 subscribes to the voice mail bridging service. Subscriber database 326 accesses a subscriber record for called party 312 to determine if called party 312 is a subscriber. Subscriber database 326 also accesses stored telephone numbers for called party 312 in the subscriber record. Subscriber database 326 then transmits a response to terminating CCF 324 indicating if the called party 312 is a subscriber and indicating the stored telephone numbers for called party 312. Assume for this embodiment that the response includes a home number and a business number for called party 312.

Terminating CCF 324 then prompts the calling party 310 through originating CCF 322 to record a voice message. Calling party 310 records a voice message which is transferred from originating CCF 322 to terminating CCF 324. Terminating CCF 324 may also prompt calling party 310 to select one or more telephone numbers of called party 312, which is not shown in FIG. 5.

At this point, terminating CCF 324 identifies the mobile number for called party 312 from the dialing information for the call, and identifies the home number and business number for called party 312 based on the response from subscriber database 326. Responsive to identifying these telephone numbers of the called party 312, terminating CCF 324 transmits the voice message recorded by calling party 310 to voice mail systems 304-306 that correspond with the telephone numbers of called party 312. The voice mail systems 304-306 then each store the voice message in a voice mailbox for called party 312. Called party 312 may subsequently retrieve the voice message from any or each of the voice mailboxes.

Figure 6:
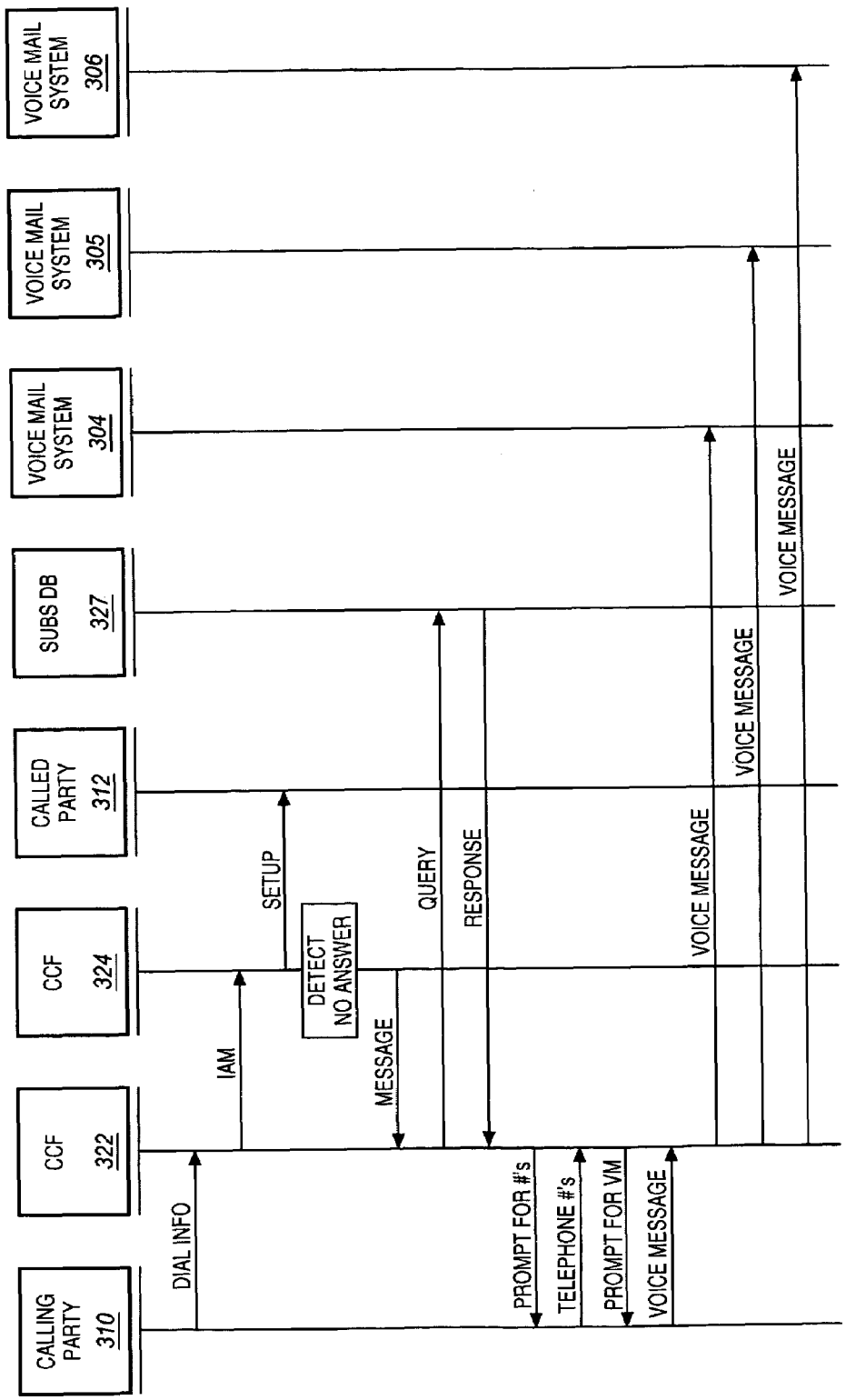
FIG. 6 is a signaling diagram illustrating an alternative operation of the communication system in FIG. 3.

FIG. 6 is a signaling diagram illustrating an alternative operation of the communication system 300 in FIG. 3. For the embodiment described in FIG. 6, calling party 310 is a subscriber to the voice mail bridging service, and called party 312 is not a subscriber. When in operation, calling party 310 dials the mobile number of called party 312 to attempt to connect a call to called party 312. Originating CCF 322 receives the dialing information from calling party 310 and transmits an IAM to terminating CCF 324. Terminating CCF 324 receives the IAM and transmits a setup message to called party 312 to ring a mobile phone of called party 312. Assume for this embodiment that called party 312 does not answer the call (e.g., no answer or busy). Terminating CCF 324 detects the no answer by the called party 312, such as after a particular number of rings. Responsive to detecting the no answer, terminating CCF 324 transmits a signaling message to originating CCF 322 indicating that called party 312 has not answered the call. Originating CCF 322 then transmits a query to subscriber database 327 for calling party 310 to determine if calling party 310 subscribes to the voice mail bridging service. Subscriber database 327 accesses a subscriber record for calling party 310 to determine if calling party 310 is a subscriber. Subscriber database 327 transmits a response to originating CCF 322 indicating if the calling party 310 is a subscriber.

Because calling party 310 is a subscriber, originating CCF 322 prompts the calling party 310 to record a voice message. Originating CCF 322 also prompts the calling party 310 to enter additional telephone numbers for called party 312 for which to leave the voice message. Calling party 310 then records a voice message in originating CCF 322. Calling party 310 also enters one or more telephone numbers for called party 312. Assume for this embodiment that calling party 310 enters a home number and a business number for called party 312 (in addition to the mobile number dialed for the call).

At this point, originating CCF 322 identifies the mobile number for called party 312 from the dialing information for the call, and identifies the home number and business number for called party 312 from the numbers entered by calling party 310. Responsive to identifying these telephone numbers of the called party 312, originating CCF 322 transmits the voice message recorded by calling party 310 to voice mail systems 304-306 that correspond with the telephone numbers of called party 312. The voice mail systems 304-306 then each store the voice message in a voice mailbox for called party 312. Called party 312 may subsequently retrieve the voice message from any or each of the voice mailboxes.

In summary, the embodiments described above advantageously bridge the voice mail systems of multiple telephone numbers so that a caller need only leave a single voice message. The caller thus does not have to leave multiple voice messages for the same called party, or guess which voice mailbox the called party will check or will check first. One particular advantage is that the invention allows for bridging of voice mail systems of different service providers. Thus, a person does not need to consolidate their home phone, cell phone, and business phone under a single service provider to receive the voice mail bridging service.

We claim:

1. A communication system, comprising:
a communication network that attempts to connect a call between a calling party and a called party, wherein the called party has a plurality of telephone numbers; and
a plurality of voice mail systems connected to the communication network that correspond with the plurality of telephone numbers for the called party;
the communication network is operable to determine that the called party has not answered the call attempt, to prompt the calling party to record a voice message, and to receive the voice message from the calling party;
the communication network is further operable to determine if the called party is a subscriber to a voice mail bridging service;
if the called party is a subscriber, then the communication network is further operable to prompt the calling party to select at least one predefined telephone number for the called party, and to transmit the voice message to the plurality of voice mail systems corresponding with the called telephone number for the called party and the at least one predefined telephone number for the called party selected by the calling party;
if the called party is not a subscriber, then the communication network is further operable to determine if the calling party is a subscriber to the voice mail bridging service;
if the calling party is a subscriber, then the communication network is further operable to prompt the calling party to enter at least one additional telephone number for the called party, and to transmit the voice message to the plurality of voice mail systems corresponding with the called telephone number for the called party and the at least one additional telephone number for the called party entered by the calling party.

2. The communication system of claim 1 wherein one of the plurality of telephone numbers comprises a home number for the called party.

3. The communication system of claim 2 wherein another one of the plurality of telephone numbers comprises a mobile number for the called party.

4. The communication system of claim 3 wherein another one of the plurality of telephone numbers comprises a business number for the called party.

5. The communication system of claim 1 wherein:
the communication network is operable to store the plurality of telephone numbers for the called party that are predefined in the communication network, and to access the stored telephone numbers to identify the plurality of telephone numbers for the called party.

6. The communication system of claim 5 wherein the communication network stores the plurality of telephone numbers for the called party in a subscriber database for the called party.

7. The communication system of claim 1 wherein each of the plurality of voice mail systems includes a voice mailbox for the called party that stores the voice message transmitted by the communication network.

8. A method of operating a communication system to provide a voice mail bridging service, wherein the communication network attempts to connect a call between a calling party and a called party, wherein the called party has a plurality of telephone numbers, the method comprising:
determining in the communication network that the called party has not answered the call attempt;

prompting the calling party to record a voice message responsive to the determination;

receiving the voice message from the calling party in the communication network;

determining if the called party is a subscriber to the voice mail bridging service;

if the called party is a subscriber, then prompting the calling party to select at least one predefined telephone number for the called party, and transmitting the voice message to the plurality of voice mail systems corresponding with the called telephone number for the called party and the at least one predefined telephone number for the called party selected by the calling party;

if the called party is not a subscriber, then determining if the calling party is a subscriber to the voice mail bridging service; and if the calling party is a subscriber, then prompting the calling party to enter at least one additional telephone number for the called party, and transmitting the voice message to the plurality of voice mail systems corresponding with the called telephone number for the called party and the at least one additional telephone number for the called party entered by the calling party.

9. The method of claim 8 wherein one of the plurality of telephone numbers comprises a home number for the called party.

10. The method of claim 9 wherein another one of the plurality of telephone numbers comprises a mobile number for the called party.

11. The method of claim 10 wherein another one of the plurality of telephone numbers comprises a business number for the called party.

12. The method of claim 8 further comprising:
storing the plurality of telephone numbers for the called party that are predefined in the communication network, and
accessing the stored telephone numbers to identify the plurality of telephone numbers for the called party.

13. The method of claim 12 wherein storing the plurality of telephone numbers for the called party comprises:
storing the plurality of telephone numbers for the called party in a subscriber database for the called party.

14. The method of claim 8 further comprising:
receiving the voice message in each of the plurality of voice mail systems; and
in each of the plurality of voice mail systems, storing the voice message in a voice mailbox for the called party.

15. A communication system, comprising:
a communication network that attempts to connect a call between a calling party and a called party, wherein the called party has a plurality of telephone numbers,
the communication network includes a terminating call control function that serves the called party,
a plurality of voice mail systems connected to the communication network that correspond with the plurality of telephone numbers for the called party; and
a subscriber database for the called party that stores the plurality of telephone numbers for the called party as predefined for a voice mail bridging service;
the terminating call control function is operable to determine that the called party has not answered the call attempt, to prompt the calling party to record a voice message responsive to the determination, to receive the voice message from the calling party, to prompt the calling party to identify the plurality of telephone numbers for the called party, and to transmit the voice message to the plurality of voice mail systems corresponding with the plurality of telephone numbers for the called party.

* * * * *